United States Patent [19]

Cramer et al.

[11] 3,881,905

[45] May 6, 1975

[54] METHOD OF MANUFACTURE OF METAL OXIDE-CONTAINING COLORED GLASS

[75] Inventors: Deane G. Cramer, Festus; Paul W. Kopp; Manuel J. Riolo, both of Crystal City, all of Mo.

[73] Assignee: PPG Industries, Inc., Pittsburgh, Pa.

[22] Filed: Feb. 21, 1974

[21] Appl. No.: 444,438

[52] U.S. Cl................................. 65/65 A; 65/99 A
[51] Int. Cl............................................ C03b 18/02
[58] Field of Search............... 65/65 A, 99 A, 182 R

[56] References Cited
UNITED STATES PATENTS 3,674,453  7/1972  Loukes et al.................. 65/99 A X
3,723,142  3/1973  Kato et al...................... 65/99 A X

*Primary Examiner*—Arthur D. Kellogg
*Attorney, Agent, or Firm*—E. Kears Pollock

[57] ABSTRACT

Colored flat glass is manufactured by forming a continuous sheet of glass while supporting the glass on a pool of molten metal in an enclosed forming chamber having a slightly oxidizing protective atmosphere within the forming chamber. As a result, glass of high quality is produced rather than a hazy-appearing glass that would be produced if such a glass were manufactured in a forming chamber having a conventional reducing atmosphere.

10 Claims, No Drawings

METHOD OF MANUFACTURE OF METAL OXIDE-CONTAINING COLORED GLASS

BACKGROUND OF THE INVENTION

This invention relates to the making of flat glass by a process in which the glass is formed while being supported on a pool or bath of molten metal and more particularly relates to the manufacture of a metal oxide-containing colored glass.

BRIEF DESCRIPTION OF THE PRIOR ART

Prior to the present invention, flat glass has been produced by supporting molten glass on molten metal and cooling it to form flat glass. Continuous processes for such flat glass production are described in U.S. Pat. Nos. 710,357 to Heal, 789,911 to Hitchcock and 3,220,186 to Pilkington. It has been known that, in the absence of a protective atmosphere, molten metal, particularly molten tin, on which glass may be floated for forming, will oxidize, producing tin oxide or dross. The dross adheres to the glass and causes defects in the glass formed in contact with molten metal. It therefore has long been known that a protective atmosphere that is a reducing atmosphere is useful to prevent such oxidation. This is shown, for example, in U.S. Pat. No. 3,241,937 to Michalik et al, which describes the use of hydrogen with nitrogen as a protective atmosphere over a molten metal pool on which glass may be formed into a flat or sheet form. U.S. Pat. No. 3,337,322 to Taylor describes the use of protective atmospheres of particular nitrogen or argon compositions which include hydrogen as a reducing gas.

All of the prior art concerning the manufacture of flat glass by such methods suggests that severe problems would be encountered if the molten metal upon which the glass is formed were allowed to oxidize. In fact, this is borne out in practice, as such known defects as tin pickup, dross and bottom marking at exit lift-out rolls in float glass manufacturing facilities have been blamed upon the oxidation of tin in float-forming chambers.

Glasses of many different compositions have been formed by floating a body of glass on molten metal and cooling and optionally attenuating it to form flat glass.

For example, both clear and colored soda-lime-silica glasses have been formed by such methods commonly called float methods. Clear soda-lime-silica glasses are glasses containing little or no color-producing metal oxides, such as iron oxide. On the other hand, colored soda-lime-silica glasses typically contain metal oxides and metals in sufficient quantity to impart color to the glass. Typical commerical colored glasses are those sold by PPG Industries, Inc., of Pittsburgh, Pennsylvania, under the trademarks "SOLEX," "SOLARGRAY" and "SOLARBRONZE." "SOLEX" glass is an iron oxide-containing glass with the iron oxide substantially as ferric oxide. This iron oxide imparts a greenish color to the glass. "SOLARGRAY" glass is a soda-lime-silica glass containing, in addition to ferric oxide, cobalt oxide, nickel oxide and selenium in appropriate proportions to impart a gray color to the glass. "SOLARBRONZE" glass is a soda-lime-silica glass containing, in addition to ferric oxide, cobalt oxide and selenium in appropriate proportions to impart a bronze color to the glass. These glasses are described in detail in U.S. Pat. Nos. 3,296,004 and Re 25,312 (2,938,808) to Duncan and Duncan et al, respectively. These glasses have been produced as continuous sheets of flat glass by floating a body of glass of an appropriate composition on a pool of molten metal.

Other colored glasses containing little or no iron oxide have been produced by other forming methods. Such glasses include glasses containing significant color-imparting quantities of cobalt oxide, nickel oxide, copper oxide, silver oxide and other like metal oxides. For example, a colored glass produced by the Pittsburgh process has been marketed by PPG Industries, Inc., Pittsburgh, Pennsylvania, under the trademark "GRAYLITE." "GRAYLITE" glass is a soda-lime-silica glass containing ferric oxide, nickel oxide and cobalt oxide in appropriate proportions to provide a glass having a gray appearance.

The applicants' first attempt to make "GRAYLITE" colored flat glass by forming it on a pool of molten metal resulted in a glass having a pronounced haze on the major surface of the glass that had been facing upward during formation and a less pronounced haze on the surface that had been in contact with molten tin during formation. The haze on the upper surface was readily apparent to the eye and upon chemical analysis was found to be a deposit containing nickel and tin. The glass did not have the desired clarity or transparency for use as architectural glass. The applicants' invention described below provides a method for making transparent haze-free colored glasses.

SUMMARY OF THE INVENTION

Glass containing nickel oxide, cobalt oxide, copper oxide, silver oxide or the like as a principal colorant is formed into flat glass by cooling it from a molten state while supporting it on molten metal in an enclosed chamber containing sufficient oxygen to substantially prevent the formation of a visually observable metal-containing material on the surfaces of the flat glass being formed.

The colored glass produced according to this invention may be a soda-lime-silica glass, an alumino-silicate glass, a borosilicate glass or any other basic glass having suitable characteristics for forming into flat glass by cooling it from a molten state while supporting it on molten metal. Inasmuch as different basic glasses comprise differing internal network structures which are believed to influence the rate and extent to which metal ions can migrate through them, the present invention has been found to be particularly applicable to the making of soda-lime-silica glasses.

The glass produced according to this invention contains one or more metal oxides as a principal colorant. The metal oxides employed as principal colorants in the glasses produced according to this invention are metal oxides that are sufficiently reducible to form free metal. The metal oxides are primarily those which have favored monoxide forms. This invention is particularly useful in the manufacture of glasses containing cobalt oxide, nickel oxide, copper oxide, silver oxide or mixtures of such oxides. A particularly preferred embodiment of this invention is a method for making glass containing nickel oxide as a principal colorant. The benefits of this invention are readily apparent in the manufacture of glasses containing more than 0.05 percent by weight of metal oxide colorant; the invention is, however, applicable to the manufacture of glasses containing as little as 0.03 percent by weight of metal oxide colorant. This invention is of particular benefit in the production of colored glasses containing insignificant amounts of iron oxide, such as glasses containing less than about 0.2 percent by weight iron oxide.

When forming flat glass according to this invention the glass is supported on a pool or bath of molten metal in an enclosed forming chamber. A space within the chamber extending over the glass and above the molten metal is filled with an atmosphere that is for the most part inert with respect to the glass, the molten metal or the interior of the chamber; however, the atmosphere contains a sufficient amount of oxygen to prevent the glass being formed from developing a metal-containing material on its surfaces.

In the absence of sufficient oxygen, the surfaces of the glass, particularly the top surface facing the atmosphere space during forming, acquire a hazy appearance. This haze is easily observable to even the untrained eye when viewing the glass under any normally convenient lighting conditions and from any convenient angle with respect to the glass surface. The haze may be observed on a fine scale by viewing the surface of the glass with a scanning electron microscope. When viewing the hazy top surface of a nickel oxide containing glass formed on the molten tin with a scanning electron microscope, the haze is observed as a plurality of substantially spherical particles having diameters of 0.5 micron or less spaced on the order of about 1 micron from one another. Using a conventional dispersive X-ray qualitative analysis technique, the particles are found to contain nickel and tin.

This haze is eliminated sufficiently to be unapparent to the eye when the present invention is practiced. The amount of oxygen necessary to practice this invention is small, and it may be provided by permitting air to leak into the enclosed forming chamber or by permitting oxygen to be carried with the molten glass into the chamber and then avoiding the introduction of sufficient reducing gas into the chamber to react with and eliminate the needed oxygen.

In contrast to the reducing gas atmospheres employed in float-forming chambers of the past, it is essential, in the practice of this invention, that the atmosphere of the forming chamber contain insufficient reducing gas to act as a reducing atmosphere. In the practice of this invention the atmosphere is preferably a slightly oxidizing atmosphere. The bulk of the atmosphere employed in the practice of this invention will be an inert gas, just as in atmospheres conventionally employed in the making of glass by conventional float methods. The inert gas component comprising the bulk of the atmosphere is preferably nitrogen, due to its ready availability. However, other inert gases, such as argon or the other noble gases or the like, may be effectively employed alone or in combination with nitrogen. There is no particular criticality to the character of the inert gas within the atmosphere, other than the requirement that the inert gas indeed be substantially inert with respect to potential reactants within the enclosed forming chamber at the temperatures of glass production.

Since it is generally possible for some oxygen to enter an enclosed forming chamber with incoming glass or due to leakage, it is usually necessary to specifically add oxygen to a forming chamber in order to practice the present invention. It is usually sufficient to merely avoid adding reducing agents to the enclosed forming chamber atmosphere in sufficient quantity to overcome the oxygen which enters the chamber by natural ingress. While it has been conventional to feed hydrogen, carbon monoxide or some other reducing gas into the atmosphere of an enclosed float-forming chamber, in the practice of this invention such addition of reducing gas to the chamber is avoided. If it is desired to inject a reducing gas into some portion of the chamber, this invention may yet be practiced by injecting oxygen to react with excessive amounts of the reducing gas.

It is convenient, in the practice of this invention, to visually observe the appearance of coolers and other exposed, relatively cold surfaces in the space above the molten glass and molten metal within the enclosed forming chamber. In the manufacture of conventional glasses by conventional float-forming techniques, such coolers or cooled objects generally acquire a black appearance, due to the deposition of tin sulfide on them. In the practice of this invention, it has been found desirable to provide a sufficiently oxidizing atmosphere so that such objects acquire a white appearance, apparently due to the formation of tin oxide rather than tin sulfide on such objects.

In general, in conventional float-forming practice, atmosphere gases are continuously fed to the enclosed forming chamber and are continuously vented therefrom. As described in U.S. Pat. No. 3,337,322, a mixture of nitrogen and hydrogen is typically fed to a plenum or enclosed space above the molten metal in a forming chamber. Typically, hydrogen comprises 0.25 percent or more of the total atmosphere gas flow, with the hydrogen content being much higher at the inlet for feeding atmosphere gases to an enclosed forming chamber. In the practice of this invention, it is preferable that no hydrogen be fed to the forming chamber or that, if fed to the chamber, the hydrogen content be limited to less than about 0.1 percent of the atmosphere.

Also, in the practice of this invention, it is preferable that the inert gas, usually nitrogen, that is fed to and vented from the enclosed forming chamber, is fed to the chamber and vented from the chamber at a rate substantially in excess of that for feeding the total atmosphere gas to an enclosed forming chamber in conventional practice. This prevents tin oxide which may form in the atmosphere space of the chamber from falling on the glass by sweeping it out of the chamber with the moving gases before it can settle according to the principles expressed in the known relationship of Stokes describing the settling of particles in a fluid.

This invention will be further appreciated from a description of preferred embodiments which follow.

DESCRIPTION OF THE PREFERRED EMBODIMENTS

The practice of this invention has found particular utility in the manufacture of nickel-containing, soda-lime-silica glasses. Glasses of the following compositions have been produced according to this method, with the glasses produced being free of haze, such as that encountered in the manufacture of glasses of such compositions using conventional floatforming chamber conditions.

Table 1

| Constituent | Amount in Percent by Weight Analyzed | | |
|---|---|---|---|
| $SiO_2$ | 72.5 | to | 73.5 |
| $Na_2O$ | 13.3 | to | 13.9 |
| $K_2O$ | 0 | to | 0.4 |
| CaO | 7.5 | to | 10.5 |
| MgO | 2.5 | to | 5.5 |
| $Al_2O_3$ | 0 | to | 0.5 |
| $SO_3$ | 0.1 | to | 0.5 |
| $Fe_2O_3$ | 0 | to | 0.1 |
| NiO | 0.08 | to | 0.11 |
| CoO | 0.01 | to | 0.02 |

In the Example which follows, a glass falling within the abovedescribed range is produced according to the present method.

EXAMPLE I

A glass batch is prepared comprising 3,078 pounds of sand, 902 pounds of soda ash, 748 pounds of dolomite, 258 pounds of limestone, 50 pounds of salt cake, 90 pounds of sodium nitrate, 0.944 pound of cobalt oxide, 4.87 pounds of nickel oxide and about 2,200 pounds of cullet or recycled glass. Such a batch composition yields a glass that contains, on an analyzed basis, about 0.04 to 0.06 percent by weight $Fe_2O_3$, with the amount of iron varying depending primarily upon the iron content of the sand employed. The nickel oxide and cobalt oxide contents of the glass are tightly controlled, with the glass being about 0.092 to 0.096 percent by weight nickel oxide and with the glass being from about 0.014 to 0.016 percent by weight cobalt oxide. The amount of colorant could be varied within or outside this range to produce glass of differing thicknesses having similar transmittances.

The glass batch materials are fed to a conventional regenerative glassmaking furnace fired with either gas or oil to heat the glass batch from above and to melt it, forming a pool of molten glass upon which the glass batch materials float until melted. The molten glass flows from a melting portion of the furnace to a refining or conditioning portion of the furnace, where it is gradually cooled to about 2,100°F. (1150°C). The glass is then delivered through a canal and onto a pool of molten tin within an enclosed float-forming chamber. The temperature of the glass in the canal is established initially at about 2060°F. (1125°C), which is a typical temperature for delivering the soda-lime-silica glass onto a pool of molten metal for forming by a float process.

Nitrogen and hydyrogen are continuously fed into the enclosed float-forming chamber above the glass and molten metal, with the hydrogen being present in an amount of the order of about 7 percent by volume of the combined volume of nitrogen and hydrogen.

The molten glass, upon delivery onto the molten tin, forms a body of molten glass which is cooled and conveyed along the surface of the molten metal to form a continuous sheet or ribbon of glass, which is drawn along the metal and then lifted up from the metal by a lift-out roll. The continuous sheet of glass is then conveyed through a seal and out from the enclosed forming chamber to an annealing lehr. The glass is produced at a rate of about 400 tons per day and is initially unsuitable for use. The upper surface of the glass has a textured appearance and a visually observable haze.

Action is then taken to alter the process in a manner which will eliminate the defective character of the glass surface.

Hydrogen flow is reduced so that the hydrogen content of the atmosphere in the forming chamber will be on the order of about 0.5 percent by volume of the total atmosphere. The surface of the glass improves somewhat in character, yet it remains unsuitable for commercial use. Finally, hydrogen flow is stopped entirely, while the nitrogen flow is increased sufficiently to provide a total flow about 10 to 15 percent greater than the total flow of atmosphere gases into the float-forming chamber at the outset, the initial flow rate being on the order of 38,000 to 39,000 standard cubic feet per hour (1075 to 1100 cubic meters per hour) and the total flow afterward being on the order of 44,000 to 45,000 standard cubic feet of nitrogen alone per hour (1465 to 1475 standard cubic meters per hour). During this time cooling of the glass within the refining section of the furnace is sufficiently increased to decrease the temperature of the molten glass within the canal on the order of about 40°F. (22°C.) to a temperature of about 2020° to 2060°F. (1100° to 1125°C). By decreasing the temperature of the entering glass, the rate of reaction between the glass colorants and residual hydrogen is diminished. It appears desirable to maintain the temperature of the entering glass below about 2050°F. Within about 4 to 8 hours, the quality of the glass improves to the extent that there is no visible haze on the surface of the glass. It is also observed during this period that the coolers within the bath change from a black appearance to a white appearance, indicating the conversion of tin sulfide on the coolers to tin oxide, due to the presence of oxygen within the float-forming chamber.

EXAMPLE II

Several glasses having different compositions and each containing at least one metal oxide colorant are prepared in small quantities by melting batch materials in platinum crucibles. A borosilicate glass is prepared, and a soda-lime-silica glass having a composition substantially like that described above is prepared. These glasses have the base compositions (including $Fe_2O_3$) indicated in the Table below in terms of percents by weight on an analyzed basis.

Table 2

| Constituent | Borosilicate Wt. % | Alumino-silicate Wt. % | Soda-Lime-Silica Wt. % |
|---|---|---|---|
| $SiO_2$ | 54.0 | 62.0 | 73.0 |
| $Na_2O$ | 7.0 | 12.1 | 13.6 |
| $K_2O$ | 10.5 | — | — |
| CaO | 12.6 | 1.2 | 8.9 |
| MgO | — | — | 4.1 |
| $Al_2O_3$ | — | 20.1 | — |
| $B_2O_3$ | 15.8 | 4.5 | — |
| $SO_3$ | — | — | 0.3 |
| $Fe_2O_3$ | 0.03 | 0.04 | 0.05 |

The following Table lists the amounts of colorants in the glass samples which are prepared.

Table 3

| Constituent | Borosilicate Sample No. | | | | | Aluminosilicate Sample No. | | | | Soda-Lime-Silica Sample No. | | |
|---|---|---|---|---|---|---|---|---|---|---|---|---|
| | 1 | 2 | 3 | 4 | 5 | 6 | 7 | 8 | 9 | 10 | 11 | 12 |
| NiO t.% | .01 | .1 | 0 | 0 | .01 | .1 | 0 | 0 | .01 | .1 | 0 | 0 |
| CoO t.% | 0 | .015 | .05 | 0 | 0 | .015 | .05 | 0 | 0 | .015 | .05 | 0 |
| CuO t.% | 0 | .01 | 0 | .05 | 0 | .01 | 0 | .05 | 0 | .01 | 0 | .05 |
| Ag$_2$O t.% | .05 | 0 | 0 | 0 | .05 | 0 | 0 | 0 | .05 | 0 | 0 | 0 |

Each of these batch samples is placed in a platinum crucible and melted. Each sample of molten glass is then poured onto a small pool of molten tin in a refractory boat within a muffle furnace maintained at about 1,900°F. (1,035°C.). The muffle furnace is provided with an atmosphere comprising nitrogen and a trace amount of oxygen. Oxygen is gradually fed into the furnace in the presence of each sample to maintain an oxygen content of approximately 0.01 percent by volume of the total atmosphere. The furnace is then permitted to cool gradually as the oxygen content in the furnace atmosphere is maintained. Finally, when the temperature falls below about 1200°F. (650°C.), a solidified disc of glass forms on the surface of the molten tin. Each glass disc formed on the molten tin is removed from the furnace. The surfaces of the glass disc samples are observed to be clear when viewed directly or at a slight angle under ordinary fluorescent light.

Based upon the production of glass in Example I having a haze on its surface, surface haze is found to be a metal-containing material on the surface of the glass that scatters incident light. The haze when analyzed, using a scanning electron microscope (for example, Model-JSM-2, JEOL, Inc.) is, observed to be globular, sphere-like particles dispersed over the surface of the glass. The particles have diameters of the order of 0.25 to 1.25 microns and are spaced from one another on the order of 1 to 5 microns center-to-center.

Qualitative analysis of the haze materials by conventional chemical analysis and by energy dispersive X-ray techniques reveals the presence of tin and metal corresponding to a metal oxide colorant. The bottom surface of the glass that had been in contact with the molten tin is pitted for glass prepared in the presence of hydrogen as in Example I. Election microprobe analysis of these pitted surfaces reveals a deficiency of metal oxide colorant in the glass immediate to the surface relative to that in the interior of the glass.

In both the small scale example and the production example when oxygen is permitted to be in the forming chamber atmosphere for an extended time, tin oxide can form causing bloom or tin speck defects on the glass. These are deposits of tin oxide on the glass surface. Therefore it is desirable to maintain the oxygen content at less than about 0.1 percent by volume of the atmosphere and even more desirable to maintain the amount of oxygen at less than about 0.01 percent by volume. Thus, in the commercial practice of this invention it is preferred that the forming chamber be as tightly sealed as possible to prevent leakage of air into it, relying solely upon oxygen entering with the molten glass to provide sufficient oxygen in the chamber. Also it is desirable to periodically inject hydrogen to reduce the tin thoroughly, meanwhile accepting a temporary loss of usable glass due to the recurrence of haze. This is preferably done about once every 5 to 15 days for a period of from about 1 to 12 hours, using from about 5 to about 15 percent by weight of hydrogen in the atmosphere.

As will be evident to those skilled in the art, the practices of this invention may be varied without departing from the spirit thereof. Accordingly, this description is intended to be illustrative only, with the invention being defined by the appended claims.

We claim:

1. In the method of making flat glass comprising the steps of melting and refining glass, delivering molten glass onto a pool of molten tin containing metal in an enclosed chamber to form a body of glass on the pool of molten metal and cooling the body of glass on the pool of molten metal to form a dimensionally stable continuous sheet of glass therefrom and removing the continuous sheet of glass from the pool of molten metal and from the enclosed chamber, the improvement wherein the glass contains at least about 0.03 percent by weight (analyzed) of a reducible metal oxide selected from the group consisting of nickel oxide, cobalt oxide, copper oxide, silver oxide and mixtures thereof, and comprising the step of feeding an atmosphere gas containing nitrogen to the enclosed chamber containing the pool of molten metal at a rate and nitrogen content sufficient to maintain an atmosphere within the enclosed chamber comprising sufficient oxygen to substantially prevent the formation of a visually observable metal-containing material on the surface of the glass.

2. A method according to claim 1 wherein the glass contains nickel oxide.

3. The method according to claim 2 wherein the glass contains from about 0.03 to about 0.2 percent by weight (analyzed) nickel oxide and the atmosphere in the enclosed chamber comprises nitrogen substantially free of hydrogen.

4. The method according to claim 3 wherein the glass consists essentially of:

| | | | | | |
|---|---|---|---|---|---|
| SiO$_2$ | from | 72.5 | to | 73.5 | percent by weight; |
| Na$_2$O | from | 13.3 | to | 13.9 | percent by weight; |
| K$_2$O | from | 0 | to | 0.4 | percent by weight; |
| CaO | from | 7.5 | to | 10.5 | percent by weight; |
| MgO | from | 2.5 | to | 5.5 | percent by weight; |
| Al$_2$O$_3$ | from | 0 | to | .5 | percent by weight; |
| SO$_3$ | from | .1 | to | .5 | percent by weight; |
| Fe$_2$O$_3$ | from | 0 | to | .1 | percent by weight; |
| NiO | from | .08 | to | .11 | percent by weight; |
| CoO | from | .01 | to | .02 | percent by weight. |

5. The method according to claim 1 wherein the glass is a soda-lime-silica glass and the molten glass is delivered onto the molten metal at a temperature below about 2050°F.

6. The method according to claim 1 wherein the molten metal is substantially molten tin and the atmosphere within the enclosed chamber is maintained to contain sufficient oxygen to cause exposed coolers within the enclosed chamber to acquire a whiteappearing coating thereon during the making of glass.

7. The method according to claim 1 wherein the atmosphere gas is fed to the enclosed chamber at a rate substantially in excess of that for feeding an atmosphere gas containing hydrogen to the enclosed chamber in the making of glass substantially free of readily reducible metal oxide colorants.

8. The method according to claim 1 wherein the atmosphere in the enclosed chamber is maintained to contain less than about 0.1 percent hydrogen.

9. The method according to claim 1 wherein a reducing gas is periodically injected into the atmosphere in the enclosed chamber for a sufficient time to substantially reduce the molten metal therein and thereafter the atmosphere is again maintained by the feeding of a nitrogen-containing atmosphere gas to comprise nitrogen and sufficient oxygen to prevent the formation of a visually observable metal-containing material on the surface of the glass.

10. The method according to claim 1 wherein the glass contains less than about 0.2 percent by weight (analyzed) iron oxide.

* * * * *